(12) United States Patent
H N et al.

(10) Patent No.: US 10,272,844 B1
(45) Date of Patent: Apr. 30, 2019

(54) FOLDABLE COVER FOR A VEHICLE DOOR

(71) Applicant: GM GLOBAL TECHNOLOGY OPERATIONS LLC, Detroit, MI (US)

(72) Inventors: Nikhil H N, Bengaluru (IN); Rama Krishna P Potharaju, Bengaluru (IN); Vinodkumar Ganiger, Bengaluru (IN); Tanmay Balse, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/889,590

(22) Filed: Feb. 6, 2018

(51) Int. Cl.
| | |
|---|---|
| *B60R 7/04* | (2006.01) |
| *B60R 11/02* | (2006.01) |
| *B60N 3/10* | (2006.01) |
| *B62D 65/14* | (2006.01) |
| *B60R 11/00* | (2006.01) |

(52) U.S. Cl.
CPC ............. *B60R 7/046* (2013.01); *B60N 3/101* (2013.01); *B60R 11/0241* (2013.01); *B62D 65/14* (2013.01); *B60R 2011/0021* (2013.01); *B60R 2011/0075* (2013.01); *B60R 2011/0094* (2013.01)

(58) Field of Classification Search
CPC .................. B60R 7/046; B60R 2011/0021
USPC ............................................... 296/37.13, 37.5
See application file for complete search history.

(56) References Cited

U.S. PATENT DOCUMENTS

| | | | | |
|---|---|---|---|---|
| 5,795,005 A | * | 8/1998 | Garfias ................... | B60R 7/046 220/9.2 |
| 6,116,672 A | * | 9/2000 | Cannon ................... | B60R 7/046 224/547 |
| 7,517,002 B2 | * | 4/2009 | Reed ....................... | B60N 3/12 264/250 |
| 2003/0052501 A1 | * | 3/2003 | Schmidt ................. | B60K 37/06 296/37.13 |
| 2016/0039348 A1 | * | 2/2016 | Bowser .................. | B60R 7/084 296/37.13 |

FOREIGN PATENT DOCUMENTS

DE             2516778 A1 * 10/1976 ................ B60J 5/00

* cited by examiner

*Primary Examiner* — Dennis H Pedder (57) ABSTRACT

One general aspect includes a cover system for a vehicle door pocket including: a first cover section; a second cover section; where the first cover section can cover a first portion of an opening to the door pocket when in an unfolded orientation and can abut the vehicle door when in a folded orientation, the first cover section can receive an elongated object and restrict movement of the elongated object thereafter; and where the second cover section can cover a second portion of the opening to the door pocket when in an unfolded orientation and abut a side of the vehicle door when in a folded orientation, the second cover section includes a tray section to retain a personal object when the second cover section is in the unfolded orientation and become a storage compartment to contain the personal object when the second cover section is in the folded orientation.

20 Claims, 11 Drawing Sheets

FOLDABLE COVER FOR A VEHICLE DOOR

INTRODUCTION

Vehicle door pockets are handy for accommodating personal objects during travel. However, normal vibrations of the traveling vehicle tend to cause these objects to rattle and generate noise that can be distracting for the vehicle operator. Such vehicular vibrations also tend to cause these objects to get scattered and disorganized within the door pocket. Moreover, objects in the door pocket can be visible to the public when the vehicle is stopped between travel destinations and can consequently invite theft. Accordingly, it is desirable to provide a cover for a vehicle door pocket that can organize personal belongings, restrict movement of these belongings to reduce travel noise, and hide the belongings. Furthermore, other desirable features and characteristics will become apparent from the subsequent detailed description of exemplary embodiments and the appended claims, taken in conjunction with the accompanying drawings.

SUMMARY

One general aspect includes a cover system for a vehicle door pocket including: a first cover section; a second cover section; where the first cover section can cover a first portion of an opening to the door pocket when in an unfolded orientation and can abut the vehicle door when in a folded orientation, the first cover section can receive an elongated object and restrict movement of the elongated object thereafter; and where the second cover section can cover a second portion of the opening to the door pocket when in an unfolded orientation and abut a side of the vehicle door when in a folded orientation, the second cover section includes a tray section to retain a personal object when the second cover section is in the unfolded orientation and become a storage compartment to contain the personal object when the second cover section is in the folded orientation.

Implementations may include one or more of the following features. The cover system where the second cover section further includes a plurality of miniature tray sections, the miniature tray sections are configured to retain respective miniature personal objects when the second cover section is in the unfolded orientation and become storage compartments configured to contain the respective miniature personal objects when the second cover section is in the folded orientation. The cover system where: the elongated object is a beverage container; the personal object is a smartphone; and the miniature personal objects are keys. The cover system where the second cover section further includes an elongated opening centrally located along a substantial portion of the second cover section, the elongated opening configured to receive planar objects into the door pocket. The cover system where the first cover section includes an opening having a plurality of flexible features to receive the elongated object and restrict movement of the elongated object thereafter. The cover system further including a mounting subsystem configured to mount the first and second cover sections to the vehicle door and permit the first and second cover sections to be in both the folded and unfolded orientations. The cover system where the mounting subsystem includes a plurality of latches, a spacing axle, and a plurality of mounting brackets. The cover system where the first and second sections are made from an elastomeric material.

One general aspect includes a vehicle door including: a door pocket having an opening, and a cover system including: a first cover section pivotably mounted to the vehicle door; a second cover section pivotably mounted to the vehicle door; where the first cover section covers a first portion of the door pocket opening when in an unfolded orientation and abuts a side of the vehicle door when in a folded orientation, the first cover section can receive an elongated object when in the unfolded orientation and restrict movement of the elongated object after being received; and where the second cover section covers a second portion of the opening to the door pocket when in an unfolded orientation and abuts a side of the vehicle door when in a folded orientation, the second cover section includes a tray section configured to retain a personal object when the second cover section is in the unfolded orientation and becomes a storage compartment configured to contain the personal object when the second cover section is in the folded orientation.

Implementations may include one or more of the following features. The vehicle door where the second cover section further includes a plurality of miniature tray sections, the miniature tray sections configured to retain respective miniature personal objects when the second cover section is in the unfolded orientation and become storage compartments configured to contain the respective miniature personal objects when the second cover section is in the folded orientation. The vehicle door where: the elongated object is a beverage container; the personal object is a smartphone; and the miniature personal objects are keys. The vehicle door where the second cover section further includes an elongated opening centrally located along a substantial portion of the second cover section, the elongated opening configured to receive planar objects into the door pocket. The vehicle door where the first cover section includes an opening having a plurality of flexible features to receive the elongated object and restrict movement of the elongated object thereafter. The vehicle door further including a mounting subsystem connected to the vehicle door and the first and second cover sections, the mounting subsystem permits the first and second cover sections to be in both the folded and unfolded orientations. The vehicle door where the mounting subsystem includes a plurality of latches, a spacing axle, and a plurality of mounting brackets. Skilled artisans will also see each component of the mounting subsystem can be made from an elastomeric material.

One general aspect includes a method of installing a cover system for a vehicle door pocket including: providing a first cover section; providing a second cover section; pivotably mounting the first cover section to a vehicle door; pivotably mounting the second cover section to the vehicle door; allowing the first cover section to cover a first portion of an opening to the door pocket when in an unfolded orientation and abut the vehicle door when in a folded orientation, where the first cover section is configured to receive an elongated object and restrict movement of the elongated object thereafter; and allowing the second cover section to cover a second portion of the opening to the door pocket when in an unfolded orientation and abut a side of the vehicle door when in a folded orientation, where the second cover section includes a tray section configured to retain a personal object when the second cover section is in the unfolded orientation and become a storage compartment configured to contain the personal object when the second cover section is in the folded orientation.

Implementations may include one or more of the following features. The method of installation where the second cover section further includes a plurality of miniature tray sections, the miniature tray sections configured to retain respective miniature personal objects when the second cover section is in the unfolded orientation and become storage compartments configured to contain the respective miniature personal objects when the second cover section is in the folded orientation. The method of installation where: the elongated object is a beverage container; the personal object is a smartphone; and the miniature personal objects are keys. The method of installation wherein the second cover section further includes an elongated opening centrally located along a substantial portion of the second cover section, the elongated opening configured to receive one or more planar objects into the door pocket. The method of installation where the first cover section includes an opening having a plurality of flexible features to receive the elongated object and restrict movement of the elongated object thereafter.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
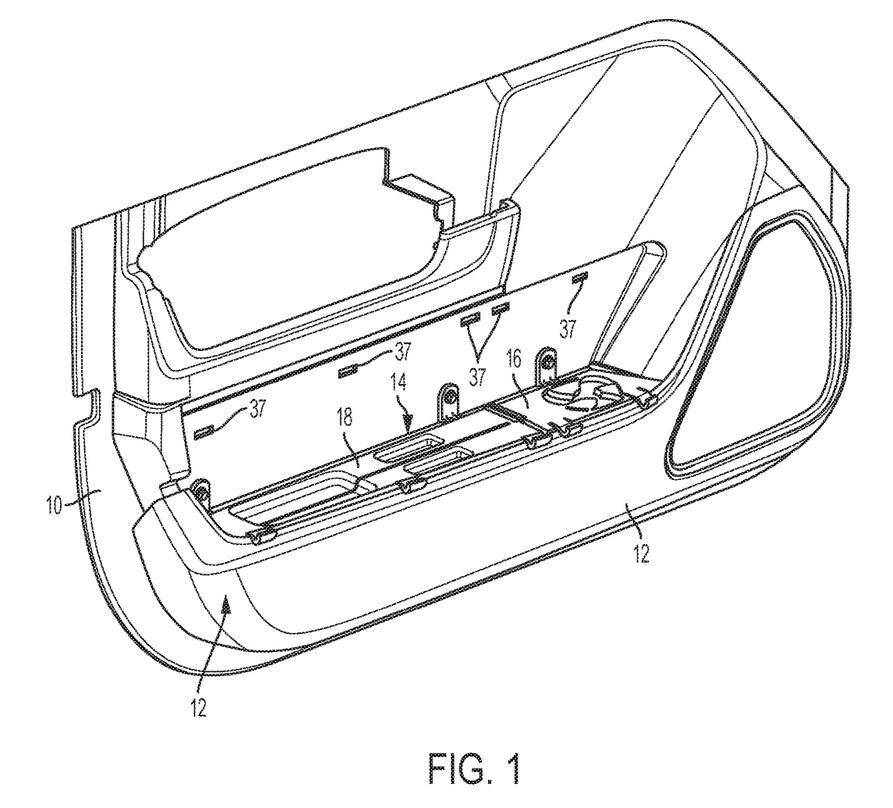
FIG. 1 shows a perspective view of an exemplary foldable cover for a vehicle door pocket according to an aspect.

Referring to FIG. 1, the vehicle door is generally indicated at 10 and includes a pocket 12 (also known as a "map pocket") that can be mounted to the interior side of vehicle door 10 or otherwise molded into the respective interior door panel. The vehicle door pocket 12 is moreover of a sufficient depth and design to store multiple personal objects each of varying sizes and shapes such as, but not limited to, smartphones, food, keys, jewelry, file documents, maps, newspaper, and beverage containers. However, outside of being a storage area with one or more internal compartments, door pocket 12 may not incorporate any other means of organization. As a result, stored personal objects are prone to spread around within door pocket 12 during vehicle travel and in turn rattle to create distracting noise. These personal objects are moreover visible to pedestrians and can invite theft when the vehicle is stopped.

Figure 2:
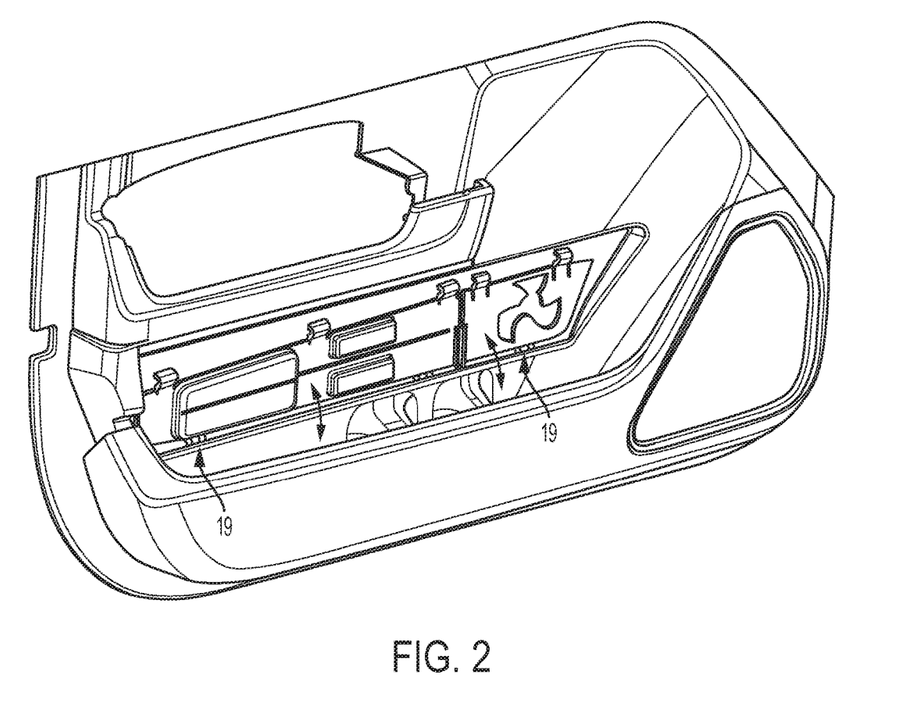
FIG. 2 shows a perspective view of the exemplary foldable cover according to another aspect.
Figure 3:
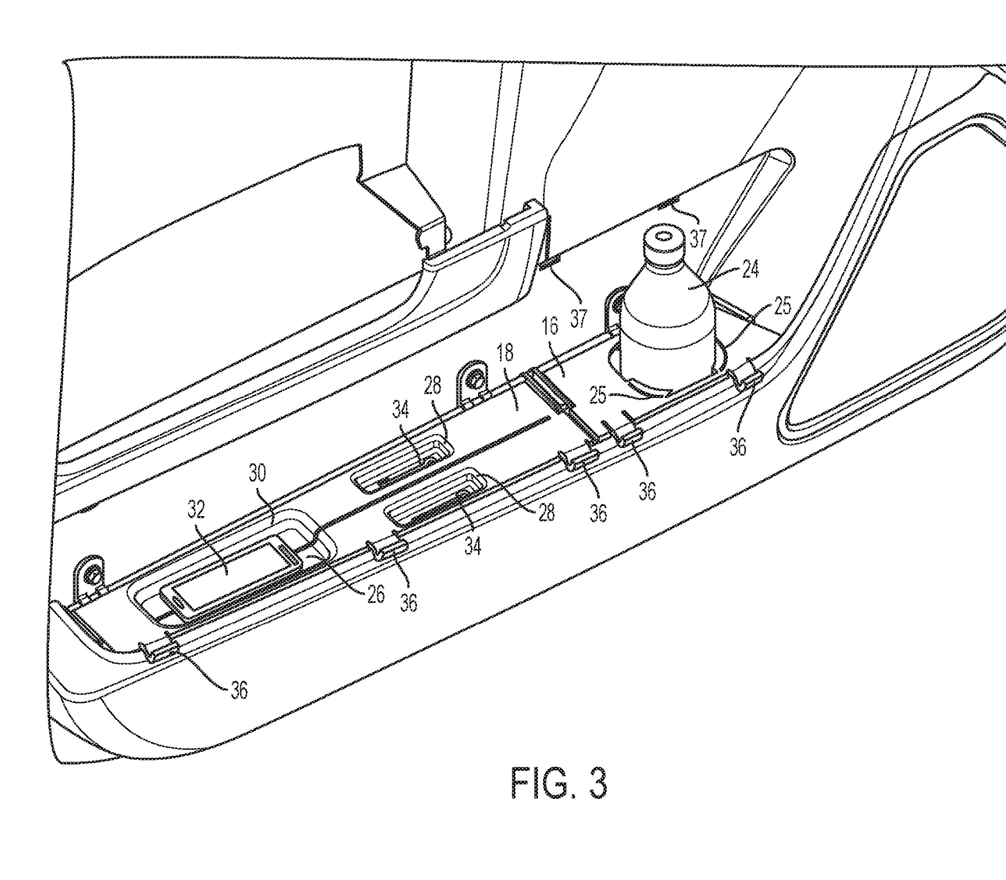
FIG. 3 shows a perspective view of the exemplary foldable cover according to another aspect.
Figure 4:
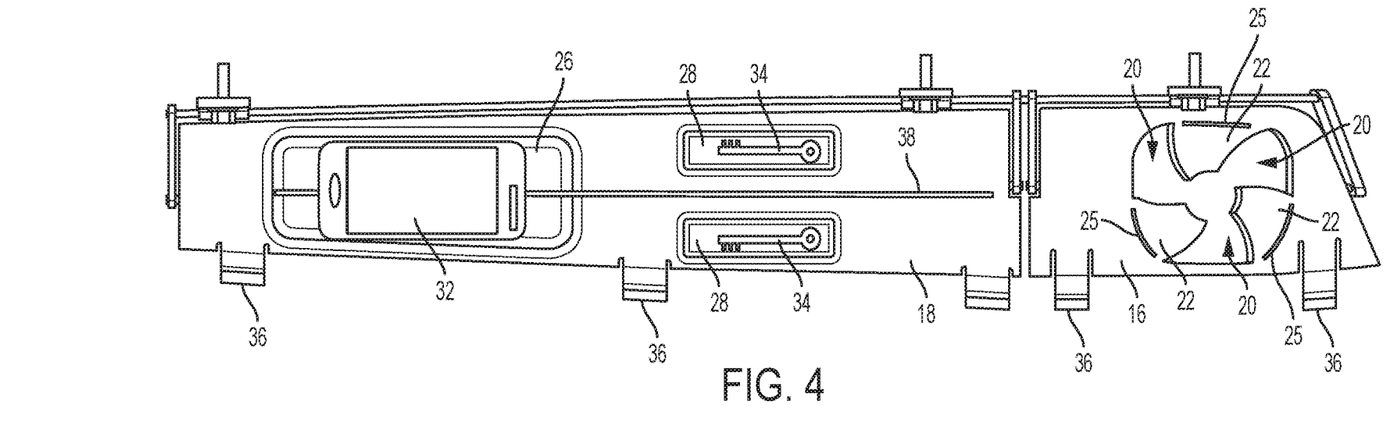
FIG. 4 shows a plan view of the exemplary foldable cover according to another aspect.

To organize these personal objects and restrict their movement, resultantly, a vehicle door pocket cover system 14 can be installed onto the interior side of door 10. Cover system 14 includes two separate and distinct foldable cover sections, a first cover section 16 and second cover section 18, each of which may be made of an elastomeric material (e.g., rubber) and can be in a folded orientation as well as an unfolded orientation. As such, when the first and second cover sections 16, 18 are in an unfolded orientation, the body of these cover sections will be perpendicular in relation to the interior side of vehicle door 10 and each cover section will conceal a respective portion of the door pocket opening 12 (as shown). However, alternatively, when the first and second cover sections 16, 18 are in a folded orientation, these cover sections will be substantially parallel in relation to the interior side of vehicle door 10 and will be pressed up against (i.e., abut) a portion of the interior side of door 12 which is situated above the perimeter of door pocket opening, referring to FIG. 2. In addition, to move from one orientation to the other, first cover section 16 and second cover section 18 laterally pivot at the periphery of door pocket opening 19, via rotatable latches 46 and a spacing axle 48 (discussed below). Skilled artisans will see that manufacturing the first and second cover sections 16, 18 from an elastomeric material such as, but not limited to, rubber will enable these cover sections to absorb vibration energy and help reduce rattle noise from door pocket cover system 14 during vehicle travel.

Figure 5A:
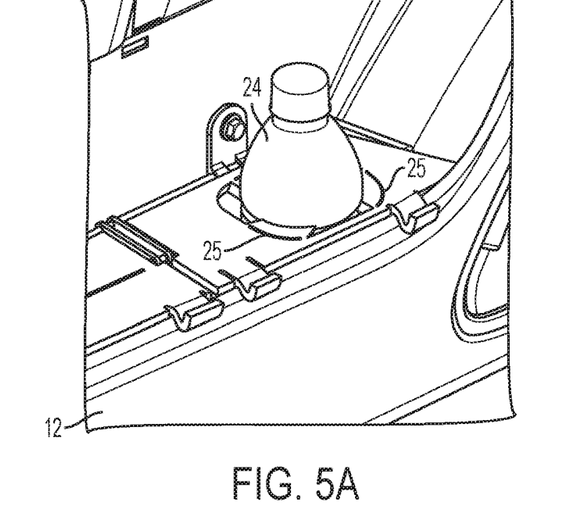
FIG. 5A shows a perspective view of a section of the exemplary foldable cover according to an aspect.
Figure 5B:
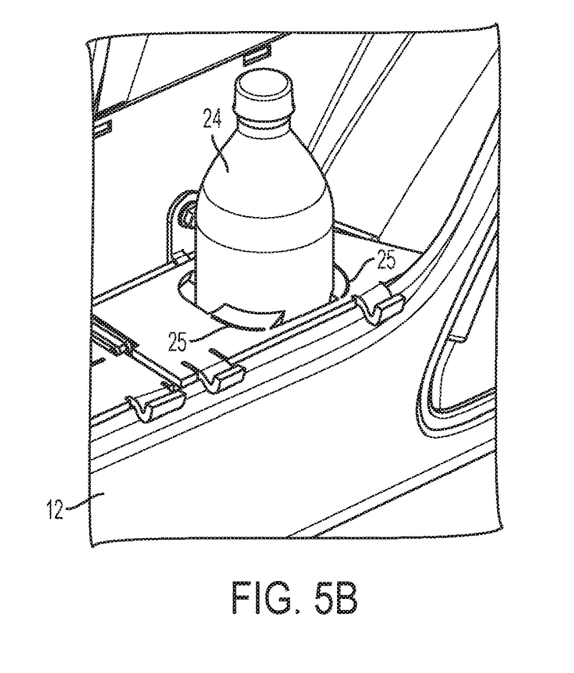
FIG. 5B shows a perspective view of the section of the exemplary foldable cover according to another aspect.
Figure 5C:
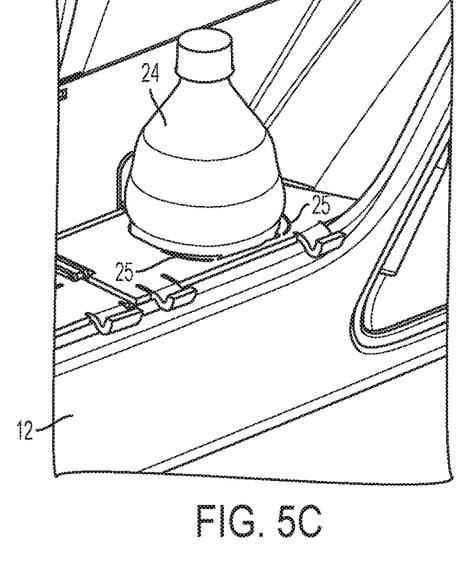
FIG. 5C shows a perspective view of the section of the exemplary foldable cover according to another aspect.
Figure 5D:
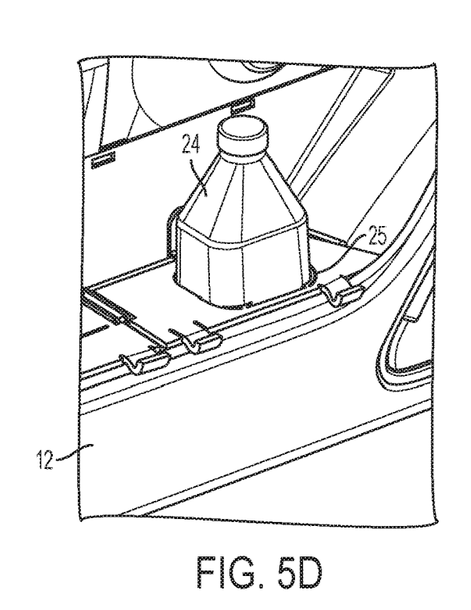
FIG. 5D shows a perspective view of the section of the exemplary foldable cover according to another aspect.

As can be understood with reference to FIGS. 3 through 5D, the first cover section 16 includes an opening 20 with three identical features 22 of a substantially flexible material (e.g., rubber, soft plastic) herein embodied as flaps. Opening 20 has a circumference large enough to easily receive elongated objects 24 such as, but not limited to, beverage containers of the typical widths (e.g., cola bottles, milk jugs, thermoses, etc.) as well as large enough to allow at least a portion of such elongated objects 24 to pass through. Moreover, when opening 20 has not received a beverage container 24, the flaps 24 will maintain a planar orientation which covers a substantial portion of the opening 20 while leaving the area around the center of opening 20 uncovered. Upon receiving a beverage container 24, each flap 24 will flex downward at a corresponding blind groove 25 (i.e., to form a crease point), imprinted on the topside of first cover section 16, to conform around the perimeter of the beverage container 24 and apply slight pressure. As a result, working in conjunction, the flaps 24 will grip the beverage container 24 and restrict its lateral and backward and forward movement. Therefore, beverage containers 24 will remain substantially stationary and erect during vehicle travel irrespective of size and cross-sectional shape. For example, as shown in FIG. 5A, opening 20 may receive and restrict movement of a rounded beverage container 24 of a certain size (e.g., 500 ml). Moreover, as shown in FIG. 5B, opening 20 may alternatively receive and restrict movement of a rounded beverage container 24 of a larger size (e.g., 750 ml). As shown in FIG. 5C, opening 20 may also receive and restrict movement of a beverage container 24 having an irregularly rounded cross section. As shown in FIG. 5D, opening 20 may further yet receive and restrict movement of a beverage container 24 of a substantially square cross section.

Referring back to FIG. 4, this embodiment of second cover section 18 includes three tray sections, a larger tray section 26 situated near two parallel miniature tray sections 28 (of the same length and width). Each of the three tray sections 26, 28 are recesses of second cover section 18 and have a substantially rectangular cross section with walls on each side. As such, while second cover section 18 is in an unfolded orientation, a personal object 32 such as a smartphone may be placed on tray section 26 and retained by its four walls so as to be restricted from extensive lateral and back and forth movement. Similarly miniature personal objects 34 such as keys may be placed on each miniature tray section 28 and retained by the four walls of the their respective tray 28 so as to be restricted from extensive lateral and back and forth movement. Therefore, when retained by their corresponding tray section 26, 28, a smart phone 32 and keys 34 can remain substantially stationary and organized during vehicle travel. Retaining the smart phone 32 and keys 34 in this manner will also ensure that more room remains free within the internal confines of door pocket 12.

Figure 6:
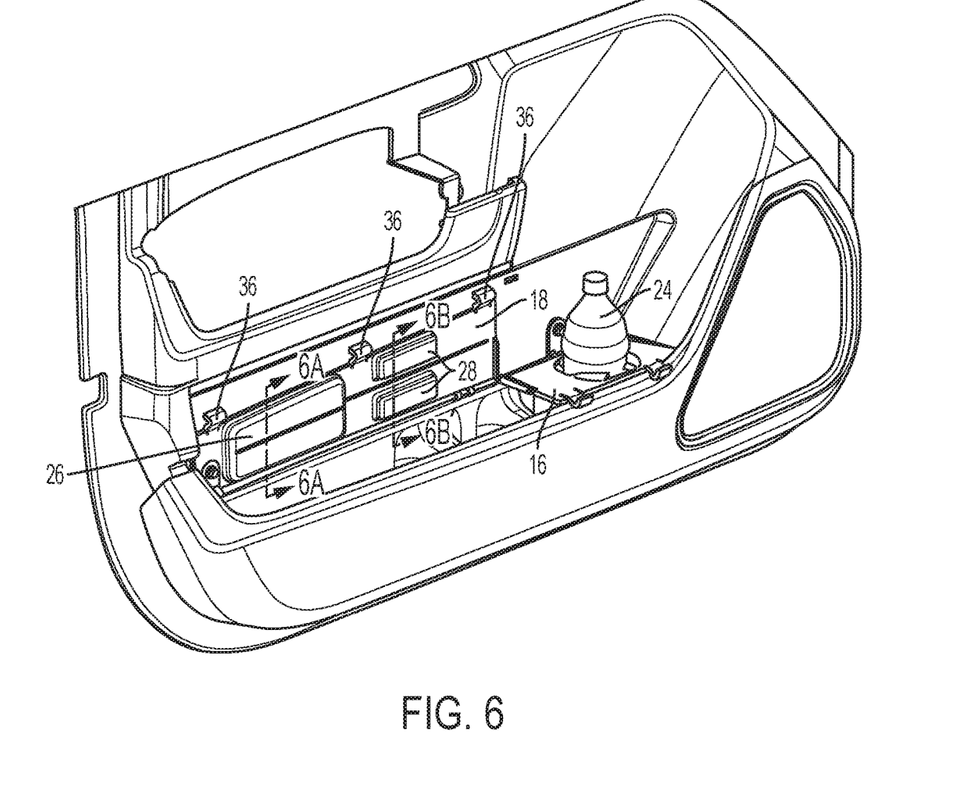
FIG. 6 shows a perspective view of the exemplary foldable cover according to another aspect.
Figure 6A:
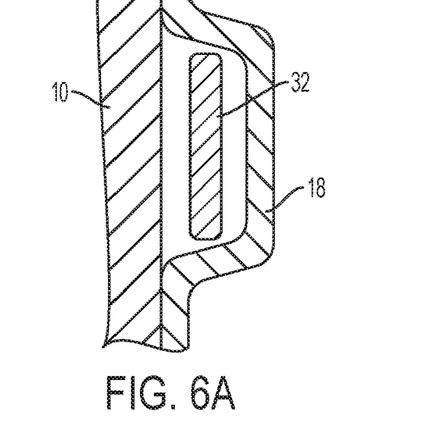
FIG. 6A shows a cross-sectional view of the exemplary foldable cover of FIG. 6 along line 6A-6A.
Figure 6B:
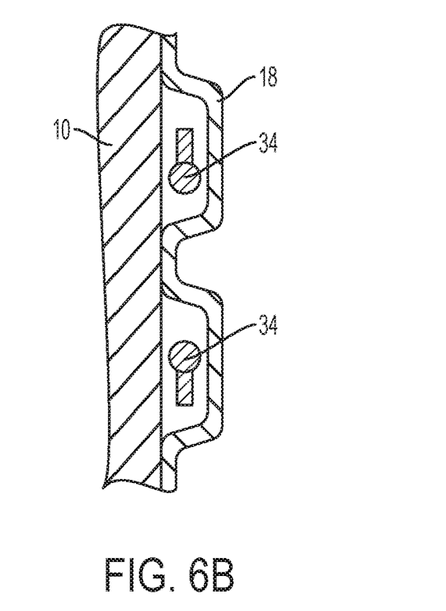
FIG. 6B shows a cross-sectional view of the exemplary foldable cover of FIG. 6 along line 6B-6B.

As can be understood with reference to FIGS. 6, 6A, and 6B, the tray sections 26, 28 can also act as storage compartments to contain their respective personal objects 32, 34 when second cover section 18 is in the folded orientation. These storage compartments enable both the personal objects 32, 34 to remain organized when access to the interior of door pocket 12 is desired. This orientation of the storage compartments also causes the personal objects 32, 34 to be hidden in plain sight. Accordingly, the storage compartments are defined by the side of vehicle door 10 on one side and the recessed boundaries of the respective tray section 26, 28 on the opposite side. As a result, for example, smartphone 32 will be interposed between the interior side of door 10 and tray section 18. Moreover, one of the tray walls 30 will act as a floor for smartphone 32 to rest on. Similarly, for example, the keys 34 will be interposed between the interior side of door 10 and their respective tray section 18 as well as propped up by one of the tray walls 30 acting as a floor. Tabs 36 releasably fasten 36 second cover section 18 to the side of vehicle door 10, via slots 37, so as to ensure second cover section 18 remains in the folded orientation and maintains the integrity of each storage compartment. It should be understood that second cover section 18 includes more or less than three total trays and the trays may be situated to have a different configuration.

Figure 7:
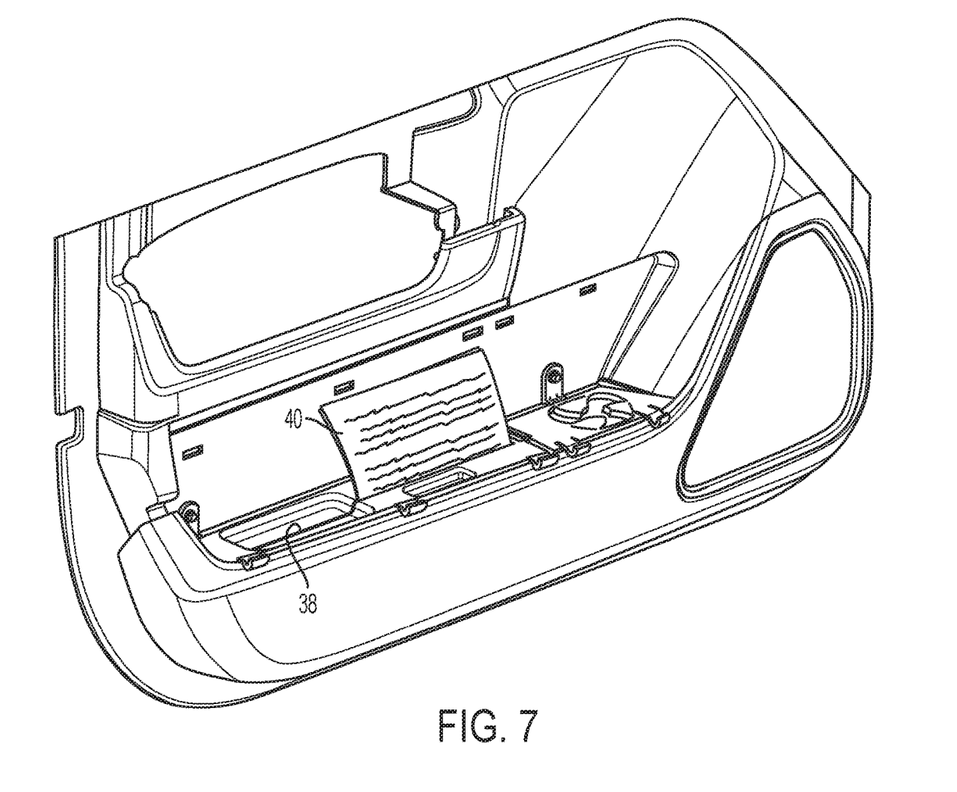
FIG. 7 shows a perspective view of the exemplary foldable cover according to another aspect.

As can be understood with reference to FIGS. 7, an elongated opening (i.e., a slit) 38 may run along a substantial portion of the center of second cover section 18. Upon insertion therein, the elongated opening 38 allows for planar objects 40 such as books, paper files, newspapers, and magazines to be stored in door pocket 12 in an organized manner and without unwanted/unintended interaction with any other stored objects. The interference fit between the sides of elongated opening 38 and the inserted planar objects 40 can also facilitate the planar objects 40 being placed within the confines of door pocket 12 in an economical manner which reserves space as well as restricts unwanted movement of the planar objects during vehicle travel.

Figure 8:
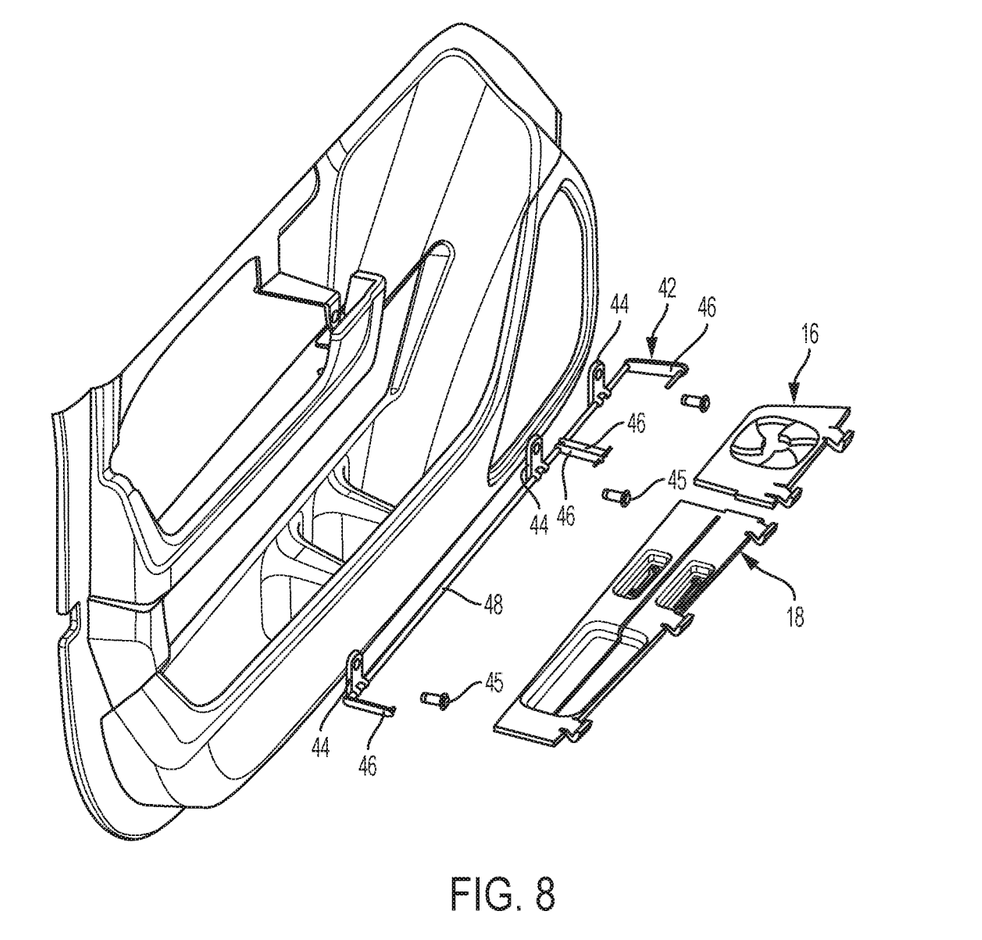
FIG. 8 shows an exploded view of the exemplary foldable cover according to another aspect.

As shown in FIG. 8, an embodiment of cover system 14 includes a mounting subsystem 42 to pivotably mount the first cover section 16 and second cover section 18 to vehicle door 12. As shown, mounting subsystem 42 includes the mounting brackets 44 which install the subsystem 42 to the interior side of vehicle door 12 via joining mechanisms such as screws 45. A number of latches 46 can be rotatably joined to these brackets 44 at one end by means of spacing axle 48 rotatably attached to bottom each installed brackets 44 via loops. Moreover, at the opposite end, the latches 46 can be joined at the ends of the first cover section 16 and second cover section 18. Thus, when the latches 46 are rotated, the first and second cover sections 16, 18 are pivoted from the folded orientation to the unfolded orientation or vice versa. Skilled artisans will see that manufacturing the mounting subsystem 42 components from an elastomeric material such as, but not limited to, rubber will enable this subsystem to absorb vibration energy and help reduce rattle noise from door pocket cover system 14 during vehicle travel.

Figure 9:
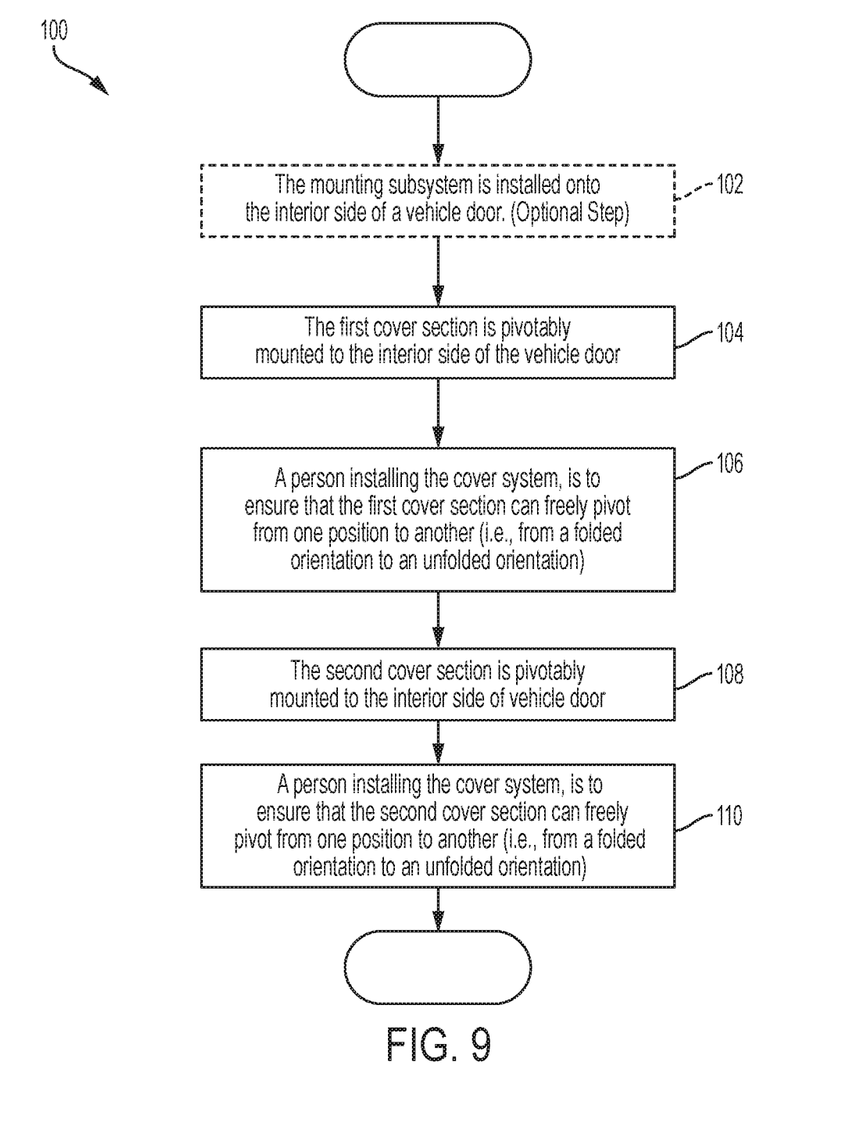
FIG. 9 is a schematic flow chart representation of one or more aspects of a method of installing the exemplary foldable cover.

Referring now to FIG. 9, a method 100 to install cover system 14 to the interior side of vehicle door 12 is shown. Method 100 begins with optional step 102 in which mounting subsystem 42 is installed onto the interior side of vehicle door 12. As such, in this step, each mounting bracket 44 is fastened to an operative location on the interior side of vehicle door 12 via screws 45. The spacing axle 48 is then operatively connected to each bracket 44 via the loops. The latches 46 are also joined to a proper location on the respective spacing axle 48. In step 104, first cover section 16 is pivotably mounted to the interior side of vehicle door 12, for example, via the end of the respective latches 46 not operatively joined to spacing axle 48. In step 106, a person installing cover system, is to ensure that first cover section 16 can freely pivot from one position to another; in essence, from a folded orientation to an unfolded orientation as discussed above. Thus, this person is ensuring that the corresponding features of mounting subsystem 42 are properly installed onto vehicle door 12 and that nothing is blocking the range of rotation for first cover section 16. In step 108, second cover section 18 is pivotably mounted to the interior side of vehicle door 12, for example, via the end of the respective latches 46 not operatively joined to spacing axle 48. In step 110, a person installing cover system, is to also ensure that second cover section 18 can freely pivot from one position to another; in essence, from a folded orientation to an unfolded orientation as discussed above. Thus, this person is ensuring that the corresponding features of mounting subsystem 42 are properly installed onto vehicle door 12 and that nothing is blocking the range of rotation for second cover section 18. Method 100 then moves to completion.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:
1. A cover system for a vehicle door pocket comprising:
a first cover section;
a second cover section;
wherein the first cover section is configured to cover a first portion of an opening to the door pocket when in an unfolded orientation and abut the vehicle door when in a folded orientation, the first cover section configured to receive an elongated object and restrict movement of the elongated object thereafter; and
wherein the second cover section is configured to cover a second portion of the opening to the door pocket when in an unfolded orientation and abut a side of the vehicle door when in a folded orientation, the second cover section comprises a tray section configured to retain a personal object when the second cover section is in the unfolded orientation and become a storage compartment configured to contain the personal object when the second cover section is in the folded orientation.

2. The cover system of claim 1, wherein the second cover section further comprises a plurality of miniature tray sections, the miniature tray sections configured to retain respective miniature personal objects when the second cover section is in the unfolded orientation and become storage compartments configured to contain the respective miniature personal objects when the second cover section is in the folded orientation.

3. The cover system of claim 2, wherein:
the elongated object is a beverage container;
the personal object is a smartphone; and
the miniature personal objects are keys.

4. The cover system of claim 1, wherein the second cover section further comprises an elongated opening centrally located along a substantial portion of the second cover section, the elongated opening configured to receive planar objects into the door pocket.

5. The cover system of claim 1, wherein the first cover section comprises an opening having a plurality of flexible features to receive the elongated object and restrict movement of the elongated object thereafter.

6. The cover system of claim 1, further comprising a mounting subsystem configured to mount the first and second cover sections to the vehicle door and permit the first and second cover sections to be in both the folded and unfolded orientations.

7. The cover system of claim 6, wherein the mounting subsystem comprises a plurality of latches, a spacing axle, and a plurality of mounting brackets.

8. The cover system of claim 1, wherein the first and second sections are made from an elastomeric material.

9. A vehicle door comprising:
a door pocket having an opening; and
a cover system comprising:
a first cover section pivotably mounted to the vehicle door;
a second cover section pivotably mounted to the vehicle door;
wherein the first cover section covers a first portion of the door pocket opening when in an unfolded orientation and abuts a side of the vehicle door when in a folded orientation, the first cover section can receive an elongated object when in the unfolded orientation and restrict movement of the elongated object after being received; and
wherein the second cover section covers a second portion of the opening to the door pocket when in an unfolded orientation and abuts the side of the vehicle door when in a folded orientation, the second cover section comprises a tray section configured to retain a personal object when the second cover section is in the unfolded orientation and become a storage compartment configured to contain the personal object when the second cover section is in the folded orientation.

10. The vehicle door of claim 9, wherein the second cover section further comprises a plurality of miniature tray sections, the miniature tray sections configured to retain respective miniature personal objects when the second cover section is in the unfolded orientation and become storage compartments configured to contain the respective miniature personal objects when the second cover section is in the folded orientation.

11. The vehicle door of claim 10, wherein:
the elongated object is a beverage container;
the personal object is a smartphone; and
the miniature personal objects are keys.

12. The vehicle door of claim 9, wherein the second cover section further comprises an elongated opening centrally located along a substantial portion of the second cover section, the elongated opening configured to receive planar objects into the door pocket.

13. The vehicle door of claim 9, wherein the first cover section comprises an opening having a plurality of flexible features to receive the elongated object and restrict movement of the elongated object thereafter.

14. The vehicle door of claim 9, further comprising a mounting subsystem connected to the vehicle door and the first and second cover sections, the mounting subsystem permits the first and second cover sections to be in both the folded and unfolded orientations.

15. The vehicle door of claim 14, wherein the mounting subsystem comprises a plurality of latches, a spacing axle, and a plurality of mounting brackets.

16. A method of installing a cover system for a vehicle door pocket comprising:
   providing a mounting subsystem;
   providing a first cover section;
   providing a second cover section;
   pivotably mounting the first cover section to a vehicle door via the mounting subsystem;
   pivotably mounting the second cover section to the vehicle door via the mounting subsystem;
   allowing the first cover section to cover a first portion of an opening to the door pocket when in an unfolded orientation and abut the vehicle door when in a folded orientation, wherein the first cover section is configured to receive an elongated object and restrict movement of the elongated object thereafter; and
   allowing the second cover section to cover a second portion of the opening to the door pocket when in an unfolded orientation and abut a side of the vehicle door when in a folded orientation, wherein the second cover section comprises a tray section configured to retain a personal object when the second cover section is in the unfolded orientation and become a storage compartment configured to contain the personal object when the second cover section is in the folded orientation.

17. The method of installation of claim 16, wherein the second cover section further comprises a plurality of miniature tray sections, the miniature tray sections configured to retain respective miniature personal objects when the second cover section is in the unfolded orientation and become storage compartments configured to contain the respective miniature personal objects when the second cover section is in the folded orientation.

18. The method of installation of claim 16, further comprising:
   wherein the mounting subsystem comprises a plurality of latches, a spacing axle, and a plurality of mounting brackets;
   mounting each mounting bracket to the vehicle door;
   operatively connecting the spacing axle to each mounting bracket;
   joining each latch to a proper location on the spacing axle;
   wherein the step of to pivotably mounting the first cover section to the vehicle door comprises operatively connecting the first cover section to the end of the respective latches not operatively joined to the spacing axle; and
   wherein the step of to pivotably mounting the second cover section to the vehicle door comprises operatively connecting the second cover section to the end of the respective latches not operatively joined to the spacing axle.

19. The method of installation of claim 16, wherein the second cover section further comprises an elongated opening centrally located along a substantial portion of the second cover section, the elongated opening configured to receive planar objects into the door pocket.

20. The method of installation of claim 16, wherein the first cover section comprises an opening having a plurality of flexible features to receive the elongated object and restrict movement of the elongated object thereafter.

* * * * *